(12) United States Patent
Hentschel

(10) Patent No.: US 10,277,734 B2
(45) Date of Patent: Apr. 30, 2019

(54) METHODS AND SYSTEMS FOR ESIM PROGRAMMING OF CELLULAR DEVICES

(71) Applicant: NATIONAL INSTRUMENTS CORPORATION, Austin, TX (US)

(72) Inventor: Tim Hentschel, Dresden (DE)

(73) Assignee: National Instruments Corporation, Austin, TX (US)

(*) Notice: Subject to any disclaimer, the term of this patent is extended or adjusted under 35 U.S.C. 154(b) by 0 days.

(21) Appl. No.: 15/681,772

(22) Filed: Aug. 21, 2017

(65) Prior Publication Data
US 2018/0054517 A1 Feb. 22, 2018

Related U.S. Application Data

(60) Provisional application No. 62/377,877, filed on Aug. 22, 2016.

(51) Int. Cl.
*H04M 3/42* (2006.01)
*H04B 7/02* (2018.01)
(Continued)

(52) U.S. Cl.
CPC .......... *H04M 3/42161* (2013.01); *H04B 7/02* (2013.01); *H04W 4/50* (2018.02);
(Continued)

(58) Field of Classification Search
CPC .. H04M 3/42161; H04M 1/7253; H04B 7/02; H04W 8/186; H04W 4/60; H04W 4/50;
(Continued)

(56) References Cited

U.S. PATENT DOCUMENTS 9,648,443 B1* 5/2017 Mayron ................ H04W 4/001
2012/0123723 A1* 5/2012 El-Hassan .......... H04B 17/0085
702/108

(Continued)

FOREIGN PATENT DOCUMENTS

WO WO2010020895 A2 2/2010

OTHER PUBLICATIONS

"Remote SIM Provisioning How it Works", downloaded on Jun. 29, 2017 from https://www.gsma.com/rsp/2017/04/12/remote-sim-provisioning-works/. 2 pp.
(Continued)

*Primary Examiner* — Mong-Thuy T Tran
(74) *Attorney, Agent, or Firm* — E. Alan Davis; James W. Huffman

(57) ABSTRACT

An apparatus includes a cellular frequency radio, either coupled to or configured to be coupled to an antenna disposed within a radio frequency (RF) shielded chamber. A cellular device includes an embedded subscriber identification module (eSIM). While the device is in the shielded chamber, a processor controls the radio to use the antenna to transmit a subscriber identification module (SIM) profile to the device and subsequently communicate with the device to test operation of the device while the device uses the SIM profile loaded into the eSIM. A cellular device includes an eSIM without a SIM profile, a cellular frequency radio, and a processor that controls the radio to wirelessly receive a SIM profile while the eSIM is still without a SIM profile, loads the received SIM profile into the eSIM, and controls the radio to wirelessly communicate with a cellular network using the SIM profile loaded into the eSIM.

16 Claims, 8 Drawing Sheets

(51) Int. Cl.
*H04W 8/18* (2009.01)
*H04W 4/60* (2018.01)
*H04W 8/20* (2009.01)
*H04W 12/06* (2009.01)
*H04W 88/06* (2009.01)
*H04W 8/24* (2009.01)
*H04W 4/50* (2018.01)
*H04W 12/04* (2009.01)
*H04W 4/80* (2018.01)
*H04L 29/06* (2006.01)
*H04W 68/00* (2009.01)
*H04M 1/725* (2006.01)
*H04W 24/06* (2009.01)
*H04W 88/18* (2009.01)
*H04W 4/70* (2018.01)

(52) U.S. Cl.
CPC ............ *H04W 4/60* (2018.02); *H04W 8/186* (2013.01); *H04W 8/205* (2013.01); *H04W 8/245* (2013.01); *H04W 12/04* (2013.01); *H04W 12/06* (2013.01); *H04W 88/06* (2013.01); *H04L 63/0853* (2013.01); *H04M 1/7253* (2013.01); *H04W 4/70* (2018.02); *H04W 4/80* (2018.02); *H04W 24/06* (2013.01); *H04W 68/005* (2013.01); *H04W 88/18* (2013.01)

(58) Field of Classification Search
CPC ......... H04W 4/70; H04W 4/80; H04W 8/205; H04W 8/245; H04W 12/04; H04W 12/06; H04W 88/06; H04W 88/18; H04W 24/06; H04W 68/005; H04L 63/0853
USPC ........................................................ 455/418
See application file for complete search history.

(56) References Cited

U.S. PATENT DOCUMENTS

| | | | |
|---|---|---|---|
| 2013/0165073 A1* | 6/2013 | Madsen | H04W 12/06 455/411 |
| 2014/0106713 A1 | 4/2014 | Skog et al. | |
| 2015/0236286 A1 | 8/2015 | Kao et al. | |
| 2016/0080932 A1* | 3/2016 | Jin | H04W 8/183 455/418 |
| 2017/0048773 A1 | 2/2017 | Miao et al. | |
| 2017/0094628 A1 | 3/2017 | Miao et al. | |
| 2017/0195830 A1* | 7/2017 | Ko | H04W 4/80 |
| 2018/0041627 A1 | 2/2018 | Maguire et al. | |
| 2018/0054729 A1 | 2/2018 | Hentschel | |

OTHER PUBLICATIONS

"The SIM for the Next Generation of Connected Consumer Devicesf"; downloaded on Jun. 29, 2017 from https://www.gsma.com/rsp/, 5 pp.

* cited by examiner

METHODS AND SYSTEMS FOR ESIM PROGRAMMING OF CELLULAR DEVICES

This application claims the benefit of U.S. Provisional Application No. 62/377,877, filed on Aug. 22, 2016 which is hereby incorporated by reference in its entirety as though fully and completely set forth herein.

BACKGROUND

Technical Field

The disclosed embodiments relate to wireless communication systems.

Current cellular user equipment (UE) devices such as mobile phones or cellular USB (Universal Serial Bus) adaptors often require a SIM (Subscriber Identification Module) card in order to connect to a cellular network. The SIM card comprises a small chip (e.g., integrated circuit) that stores information used by the UE device to connect to the cellular network. The SIM card is typically provided by the network operator or service provider of the network in which the user wants to operate his user equipment (e.g., AT&T, Verizon, etc.).

Among other data, the SIM card stores a SIM profile including the subscriber phone number. The SIM card is also used in the authentication procedure when the UE device connects to the cellular network. A conventional SIM card contains fixed, non-volatile and non-changeable content for the SIM profile within non-volatile memory or data storage that is part of the integrated circuitry for the SIM card.

SIM card implementations have also previously been developed (e.g., Apple SIM) that are indirectly user programmable. For example, through a software application (e.g., provided by Apple) downloaded to a mobile device, a user can select a particular data plan from any of the available network operators. The software application configures or programs the programmable SIM within the mobile device by writing the necessary content to programmable memory or data storage associated with the programmable SIM. In this way, the user device can connect to the network selected by the user.

A new version for a SIM card is the embedded subscriber identification module (eSIM). An eSIM can be implemented as programmable electronic circuitry that can be programmed to store a SIM profile and related information. As such, an eSIM is no longer required to be part of a SIM card but can be included as part of other circuitry for a UE device. For example, an eSIM can be integrated into and/or combined with other electronic components for a UE device during manufacturing of the UE similar to other electronic components that are part of a UE device. Similar to prior programmable SIM cards (e.g., Apple SIM), the eSIM is also freely programmable to allow for a user to connect the UE device to any desired server provider network.

To program an eSIM, a SIM profile is typically downloaded and programmed into the eSIM. Typically, a host application is first connected to the UE, and the SIM profile is then downloaded to and stored in the eSIM. For example, a smart phone, smart mobile handset, and/or a smart watch can include an eSIM that is programmed by downloading a SIM profile and storing it within the eSIM for the device.

With respect to a smart phone implementation, an application that programs the eSIM is typically run on the smart phone. The user uses this application to scan a QR (quick reference) code for a data plan contract, and the user possibly may also be required to validate the plan with a PIN (personal identification number). Once the application has this data, the application connects via the Internet to the server of the network provider, pulls the correct SIM profile for the smart phone, and loads it directly to the eSIM. As the application is running on the smart phone, it has access to the eSIM. This application also activates the new SIM profile and displays the status after such activation to show the user whether or not the procedure was successful. As such, the UE smart phone typically needs an internet connection to the server of the network provider for this eSIM programming process. This internet connection can be established, for example, through a computer system (e.g., personal computer (PC)) that is connected to the UE (e.g., via Bluetooth or USB), or via the cellular connection of the UE itself in the use case of a SIM profile upgrade, i.e., there is a SIM profile already existing on the smart phone that can be used to establish an internet connection via the cellular connection to download the new profile.

With respect to a smart watch implementation, the smart watch typically needs to be connected to a smart phone via Bluetooth for configuration. The application that programs the eSIM of the smart watch runs on the smart phone, and the whole process then works similar to the process described above for a smart phone implementation. Once the application has pulled the SIM profile from the network operator, the application then transfers it via Bluetooth to the smart watch and programs the eSIM in the smart watch.

An eSIM can also be implemented as a software-based SIM (soft SIM) that uses software running on the processor of the UE device to perform the functions of the traditional SIM card. The SIM profile is still received and stored by the UE device, for example, within memory or data storage for the UE device. The programming of the soft SIM is similar to the programming of the eSIM described above. The SIM profiles are downloaded and transferred to the UE device through the SIM software application executed by the processor for UE device, and the SIM profile is stored by the processor in memory or data storage for the UE device.

Battery power is expended by smart phones and smart watches as part of a SIM profile download and programming process. However, these devices are typically expected to be charged daily or every few days, and this battery usage is typically viewed as acceptable. For some newer low power cellular devices, such as low power IoT (internet of things) cellular devices, this power usage would drain battery power for the low power IoT device and adversely affect long term performance and viability.

SUMMARY

Disclosed embodiments provide methods and systems to program, activate, and/or verify the activation status of eSIMs for low power wireless devices for IoT solutions without requiring a user interface within the IoT device and without adversely affecting battery power for the IoT device. A wide variety of variations can also be implemented while still taking advantage of the eSIM activation, programming, and verification techniques described herein.

In certain example embodiments, over-the-air (OTA) communications are used to communicate with the device in a controlled radio frequency (RF) environment. Such a controlled RF environment is provided, for example, with an RF shielded chamber in which the device is placed. For relatively small low power devices, this RF shielded chamber can be, for example, about the size of a microwave oven depending on the shielding requirements. Further, disclosed embodiments can also include user interfaces, such as a graphical user interface displayed through a video display, and can include other circuitry such as a controller, radio, data storage devices, and/or other electronic circuitry mounted or otherwise included as part of a housing that includes the RF shielded chamber. In additional embodiments, a communication interface is included to allow communications between the electronic circuitry within the low power eSIM activation device and an external computing system, such as a personal computer (PC), server, or other external electronic system. A variety of connections or links can be used to provide this communication interface such as, for example, Ethernet connections, USB connections, and/or other wired connections. Wireless connections can also be used for this additional communication interface, although wired connections are preferred to avoid RF interference. The external computer system can then be used to provide a visible user interface through which programming, activation, and/or verification information can be displayed to a user. Other variations can also be implemented.

For further example embodiments, the eSIM activation equipment or device is also configured to test the low power IoT device. One or more test routines can be stored by the eSIM activation device and can be used to test the operation of the low power IoT device once the eSIM within the device is configured and activated with SIM profile. For this testing and/or other operations, the RF shielded chamber is used to simulate base station communications to the low power IoT device. For example, additional radio circuitry can be included as part of the eSIM activation device to allow for communications that simulate the base station operation for the wireless communication system related to the SIM profile being downloaded and programmed into the eSIM for the low power IoT device. These test routines can be used, for example, to verify proper operation of the low power IoT device once the eSIM has been programmed with the SIM profile and activated. The test routines can be used for other purposes as well.

Still further, additional embodiments are described that provide wireless power to the low power IoT device using a wireless power supply. The low power IoT device includes activation link circuitry and a short range wireless (SRW) radio that is isolated from a battery supply for the low power IoT device and is separately powered by the wireless power supply. This activation link circuitry and SRW radio are then used to download a SIM profile for the low power IoT device and to program the eSIM within the low power IoT device with the downloaded SIM profile. The activation link circuitry can also be used to control the cellular radio on the low power IoT device in order to allow communication with a simulated base station and/or an actual base station for the wireless communication system associated with the SIM profile programmed into the low power IoT device.

Other variations can also be implemented while still taking advantage of the eSIM programming, activation, and verification techniques described herein.

In some embodiments, an apparatus includes a cellular frequency radio, either coupled to or configured to be coupled to an antenna disposed within a radio frequency (RF) shielded chamber configured to receive a cellular device. The device includes an embedded subscriber identification module (eSIM). A processor is programmed to, while the device is in the shielded chamber, control the radio to use the antenna to transmit a subscriber identification module (SIM) profile to the device and subsequently communicate with the device to test operation of the device while the device uses the SIM profile loaded into the eSIM.

In some embodiments, a method for loading a subscriber identification module (SIM) profile into a cellular device having an embedded subscriber identification module (eSIM) includes placing the device into a radio frequency shielded chamber, transferring the SIM profile to the device wirelessly using signals in a cellular frequency range while the device is in the shielded chamber, and loading the transferred SIM profile into the eSIM of the device.

In some embodiments, a cellular device includes an embedded subscriber identification module (eSIM) without a subscriber identification module (SIM) profile, a cellular frequency radio, and a processor configured to control the radio to wirelessly receive a SIM profile while the eSIM is still without a SIM profile, load the received SIM profile into the eSIM, and control the radio to wirelessly communicate with a cellular network using the SIM profile loaded into the eSIM. The device is without a user interface capable of outputting to a user results of a test of operation of the device using the SIM profile loaded into the eSIM.

In some embodiments, a method for loading a subscriber identification module (SIM) profile into a cellular device having an embedded subscriber identification module (eSIM) includes placing the device into a radio frequency shielded chamber, transferring the SIM profile to the device wirelessly using signals in a non-cellular, short range wireless (SRW) frequency range, loading the transferred SIM profile into the eSIM of the device, and simulating a cellular network base station to communicate with the device using signals in a cellular frequency range to test operation of the device while the device uses the SIM profile loaded into the eSIM. The simulating is performed while the device is in the shielded chamber and after said transferring the SIM profile to the device.

DESCRIPTION OF THE DRAWINGS

It is noted that the appended drawings illustrate only exemplary embodiments and are, therefore, not to be considered limiting of the scope of the present inventions, for the inventions may admit to other equally effective embodiments.

DETAILED DESCRIPTION

Terms

Figure 1:
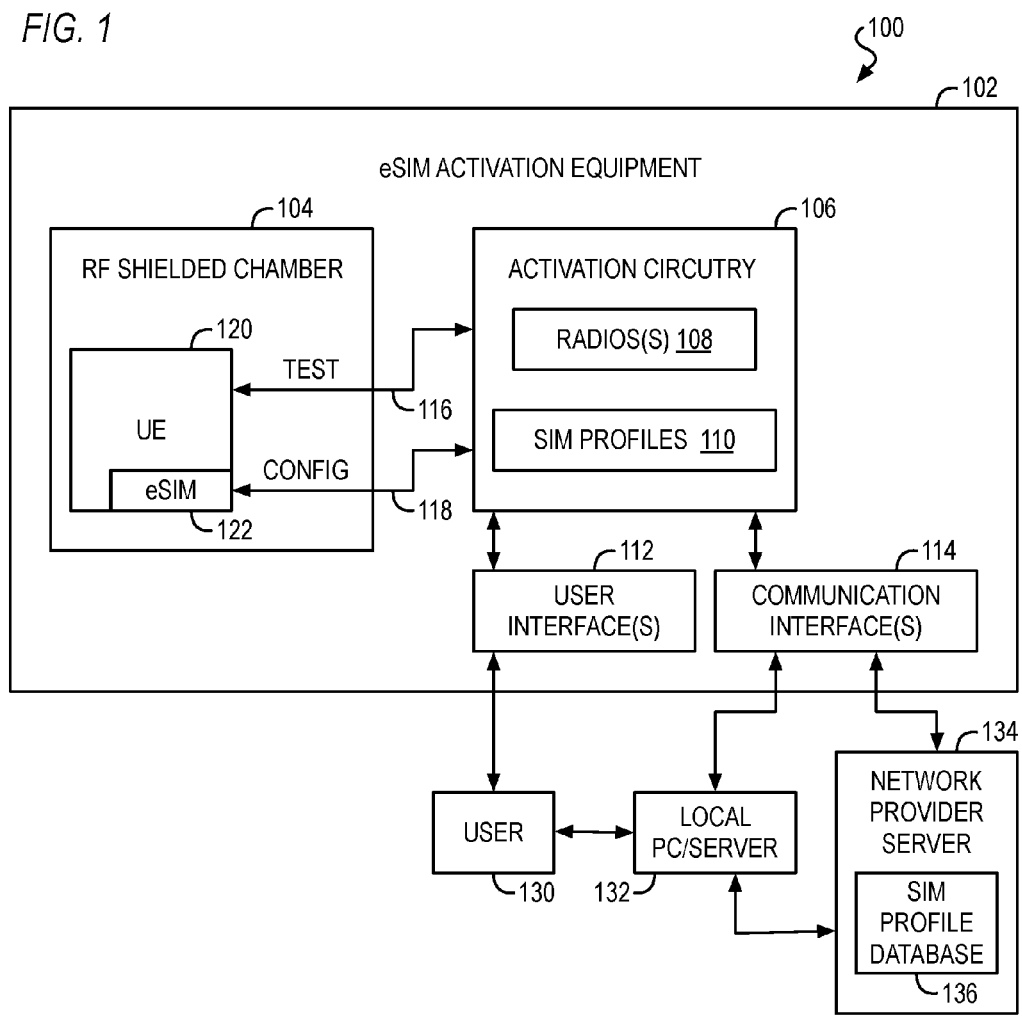
FIG. 1 is a diagram of an example embodiment for eSIM activation equipment that operates as an eSIM activation device to program, activate, and/or verify eSIM operation for low power cellular devices.

The term cellular frequency is intended to be interpreted according to its well-understood meaning, which includes a cellular frequency includes all frequencies dedicated to cellular communications by the World Radio Conference and standardized by 3GPP for cellular technologies, which includes current and future standards.

The term radio frequency (RF) shielded chamber is intended to be interpreted according to its well-understood meaning, which includes a RF shielded chamber is an enclosed space or cavity that shields RF signals from entering or exiting the enclosed space or cavity.

The term subscriber identification module (SIM) profile is intended to be interpreted according to its well-understood meaning, which includes a SIM profile is information that specifies a cellular network subscriber phone number and information used in the authentication procedure when the subscriber's device connects to the cellular network. Examples of the authentication information include an international mobile subscriber identity (IMSI) number and its related key, a personal identification number (PIN) and a personal unblocking code (PUK).

The term embedded subscriber identification module (eSIM) is intended to be interpreted according to its well-understood meaning, which includes a eSIM is programmable electronic circuitry that can be programmed to store a SIM profile and related information.

The term wireless power supply is intended to be interpreted according to its well-understood meaning, which includes a wireless power supply is a transmitting device that powers, via wireless power transmission, secondary power supply of a receiving device using time-varying electric, magnetic, or electromagnetic fields. For example, a wireless power supply may be an inductive power source that inductively powers the secondary power supply of the receiving device. For example, the wireless power supply can be a pad or platform upon, or adjacent to, which the receiving device can be placed. For example, the wireless power supply may conform to wireless charging standards, e.g., Qi, Powermat, A4WP, and/or other wireless charging standards.

New low power wireless devices for IoT (internet of things) solutions are often designed for applications where battery life is required to last for two or more years and preferably for five or more years. It is also desirable, however, for such new low power cellular devices to include cellular connections for certain IoT solutions, and it is also desirable for these cellular connections to be configurable through a SIM profile downloaded and stored with respect to an eSIM for the low power device. Two things are needed, however, to download the SIM profile to the eSIM: (1) a device with a user interface to initiate the eSIM programming procedure with the right authentication data, and (2) a connection from a programming device to the device with the eSIM.

New low power IoT devices, however, often do not include a user interface (e.g., visible display). Examples of such devices are power meters, motion sensors, humidity sensor, flower pot water sensors, and/or other low power IoT devices. Further, to reduce the power consumption of such devices, they are typically designed with minimum functionality that is designed only to meet the functional needs for them to serve their particular design purpose. As such, these devices typically do not have circuitry to connect to any other additional wireless network other than the cellular network itself. For example, a humidity sensor IoT device could have sensor circuitry that detects humidity and a cell radio that connects to the cellular network such as for example using the new standard NB-IoT (Narrowband IoT, also known as LTE-NB1 or LTE-M2). Because the battery lifetime of such IoT devices should be longer than two (2) years and preferably longer than five (5) years, any additional non-essential functionality is typically excluded from the device if it consumes additional power. As indicated above, therefore, including eSIM and related circuitry to download and configure SIM profiles is typically assumed to be a non-viable solution for low power IoT devices as this circuitry consumes power from batteries for such devices and is not directed to the primary end-use purpose for the device.

The disclosed embodiments provide methods and systems to program, activate, and/or verify the activation status of eSIMs for low power wireless devices for IoT solutions without requiring a user interface within the IoT device and without adversely affecting battery power for the IoT device. Other advantages can also be provided. Further, for the embodiments disclosed herein, it is noted that an eSIM refers to any programmable electronic circuits within an UE device that receive and store one or more downloaded SIM profiles and related information. Thus, an eSIM can be implemented as hardware circuitry integrated within one or more integrated circuits for an UE device, as software instructions executed by a processor within the UE device, or as a combination of hardware and software included within the eSIM device that is configured or programmed to perform the eSIM activation, programming, and verification described herein. As such, a wide variety of variations can be implemented for the disclosed embodiments.

FIG. 1 is a diagram of an example embodiment 100 for eSIM activation equipment 102 that operates as an eSIM activation device. An RF shielded chamber 104 and activation circuitry 106 are mounted, integrated with, or otherwise included within a housing that can also include the other components for the eSIM activation equipment 102. One or more user interfaces 112 and/or one or more communication interfaces 114 can also be coupled to the activation circuitry 106 and be included as part of the housing. The activation circuitry 106 includes one or more radios 108 that are used to communicate configuration messages 118 and test messages 116 with the UE 120. The configuration messages 118 are used to download a SIM profile 110 to the UE 120 that is then programmed by the UE 120 into the eSIM 122. The test messages 116 are used to test or verify the UE 120 for the intended cellular communication system associated with the SIM profiles 110, for example, by simulating a base station for the intended cellular communication system.

The SIM profiles 110 can be downloaded from a SIM profile database 136 stored by a server 134 for the network provider of the cellular system for which the UE 120 is being configured. Further, this network provider server 134 can be a network-connected server such as an Internet-based server. Once downloaded from the server 134, the activation circuitry 106 can also be configured to locally store the SIM profiles 110 that are then loaded into the eSIM 122 for the UE 120. It is also noted, however, that the activation circuitry 106 can also download a SIM profile from the server 134 after initiation of the eSIM activation process, and this downloaded SIM profile can be communicated directly to the UE 120 without first storing it locally.

If included, the one or more user interfaces 112 are used to display programming, activation, and/or verification information to a user 130, such as through a video display, as described herein. The user interfaces 112 can also include or be associated with one or more user input/output (I/O) devices to allow for user input (e.g., mouse, pointer, keyboard, etc.). If included, the one or more communication interfaces 114 can be any wired or wireless connection or link, as described herein, although wired connections are preferred to avoid RF interference. Further, the communication interfaces 114 can be used to communicate with a local personal computer (PC) or server 132, for example, through which the user 130 interfaces with the eSIM activation equipment 102. The communication interfaces 114 can also be used to communicate with the network-connected or Internet-based server 134 that is operated by the network provider and that stores SIM profiles within the SIM profile database 136. It is also noted that local PC/server 132 can be configured to download the SIM profile from the server 134 and then provide this downloaded SIM profile to the eSIM activation equipment 102 through the communication interfaces 114. Other variations could also be implemented while still taking advantage of the eSIM programming, activation, and/or verification described herein.

Figure 2:
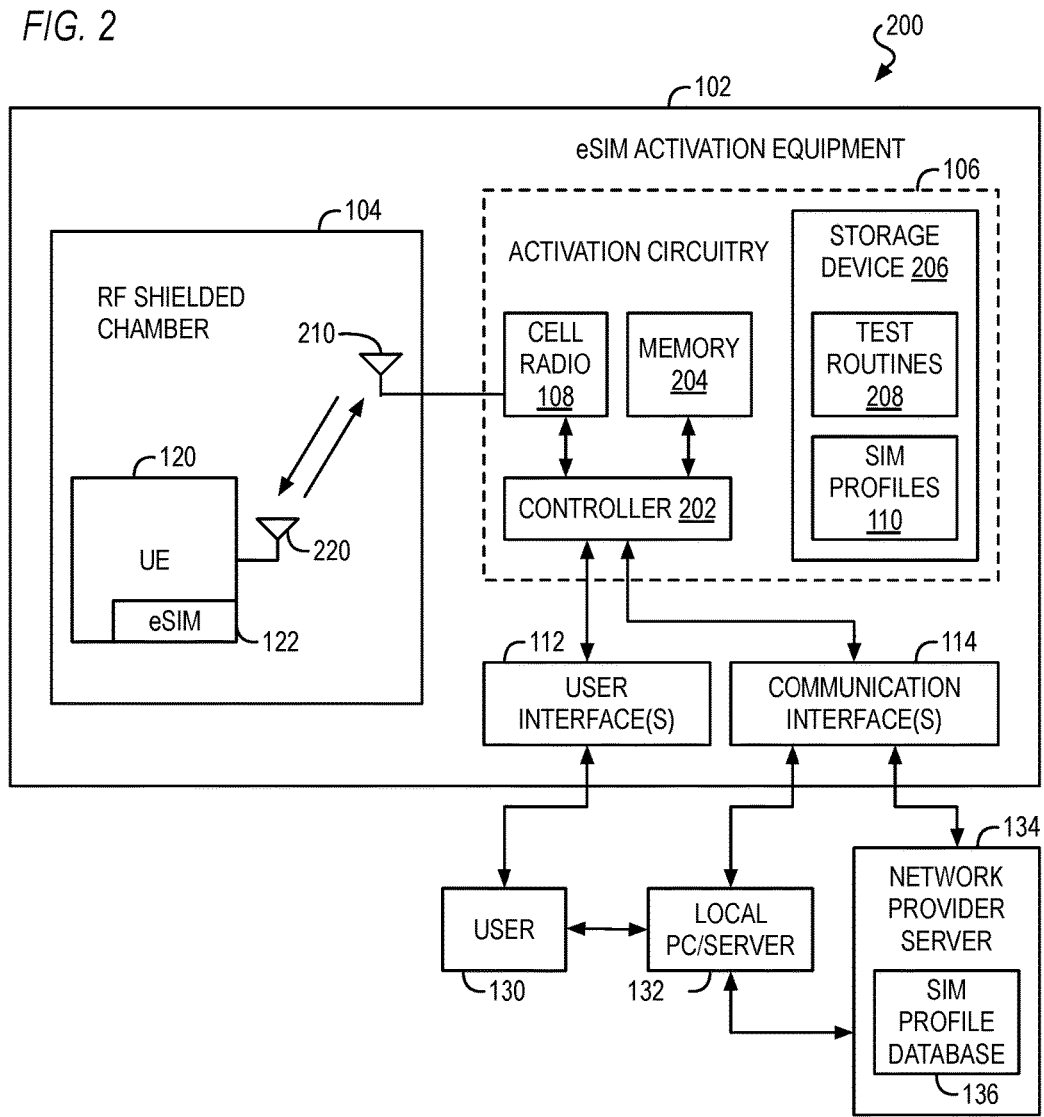
FIG. 2 is a diagram of an example embodiment for eSIM activation equipment that operates as an eSIM activation device and uses a simulated cellular environment.

FIG. 2 is a diagram of an example embodiment 200 for eSIM activation equipment 102 that operates as an eSIM activation device. For this example embodiment, the activation circuitry 106 includes a cellular (cell) radio 108, a controller 202, memory 204, and storage device 206 that stores test/verification routines 208 along with SIM profiles 110 (if stored locally). An antenna 210 is coupled to the cellular radio 108 and is configured to transmit/receive RF signals within the RF shielded chamber to an antenna 220 for the UE device 120. The UE 120 includes an eSIM 122 along with a battery and other electronic circuitry. It is also noted that the SIM profiles 110 can also be stored in the memory 204, for example, if downloaded from an Internet-based server 134 and only stored temporarily by the activation circuitry 106.

In operation, the UE device 120 is put into the RF shielded chamber 104 of a test box or housing that includes the controller 202, the user interface(s) (UIs) 112, and/or the communication interface(s) 114 (e.g., to connect to a local PC/server 132 and/or network server 134) along with the cell radio 108 and the antenna 210 that provides RF transmission into and reception from inside the RF chamber of cellular signals. The cell radio 108 and the antenna 210 that provides RF transmission and reception can be, for example, a USRP (universal software radio peripheral) device and related antennas available from National Instruments that simulates the base station of a mobile network inside the RF shielded chamber that can connect to the UE device 120. Example embodiments for wireless communication systems providing universal software radio system solutions are described within U.S. Published Patent Application 2015/0326286, entitled "MASSIVE MIMO ARCHITECTURE," which is hereby incorporated by reference in its entirety.

The communication protocol of cellular devices typically includes data channels and control channels. The control channel of the protocol is used by the eSIM activation equipment 102 to connect to the UE device 120 and to download a SIM profile 110 to the UE device 120 and to activate it. Once the SIM profile 110, for example including a PIN (personal identifier), is downloaded and activated, the UE device 120 will, in accordance with its standard configuration, automatically start to connect to the simulated network in the RF shield chamber according to its SIM profile. The reception functionality of the eSIM activation equipment 102 will receive the signal, compare it with a pre-defined expected signal, and issue a verdict of that test and/or verification that is shown on the UI 112 and/or communicated through the communication interface 114.

It is noted that the controller 202 can be implemented as one or more processors and/or other programmable integrated circuits that are programmed to carry out the function described herein. For example, the controller 202 can load and execute instructions stored in one or more non-transitory data storage mediums, for example that are stored in storage device 206, to cause the eSIM activation equipment to perform the functions described herein. Memory 204 can be used by controller 202 to load and execute such instructions. Other variations could also be implemented.

Figure 3:
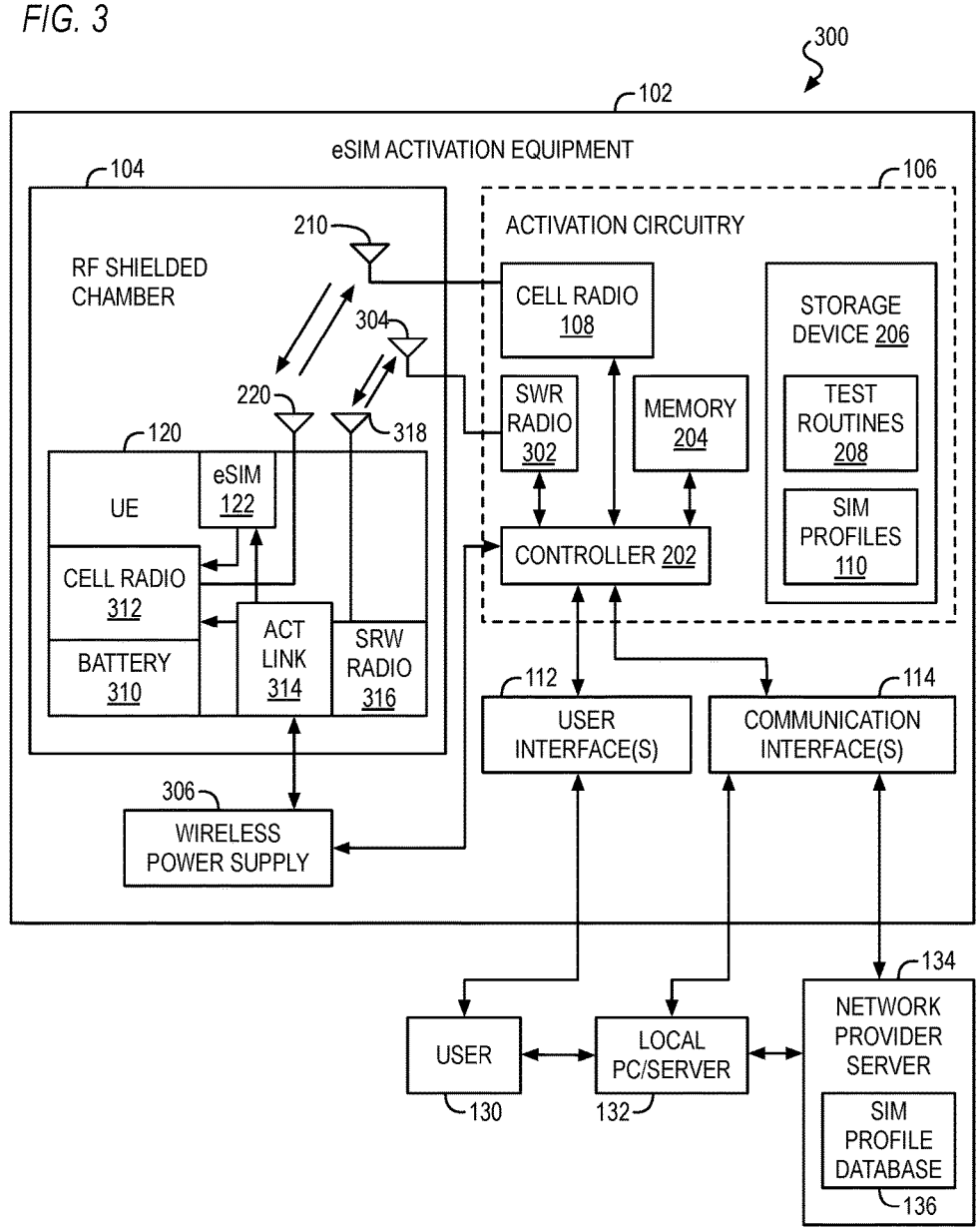
FIG. 3 is a diagram of an example embodiment for eSIM activation equipment that operates as an eSIM activation device and uses a simulated cellular environment along with wireless powering of a separate wireless activation link.

FIG. 3 is a diagram of an example embodiment 300 for eSIM activation equipment 102 that operates as an eSIM activation device. For this example embodiment, the eSIM activation equipment also includes a wireless power supply 306 configured to wirelessly power circuitry within the UE device 120. In addition, the activation circuitry 106 also includes a short range wireless (SRW) radio 302 and a related antenna 304 that are configured to transmit/receive wireless signals within the RF shielded chamber 104. It is noted that antenna 210 can also be shared by the cellular radio 108 and the SRW radio 302, if desired, rather than including an additional antenna 304.

In addition, for this example embodiment, the UE device 120 also includes activation link circuitry 314, an SRW radio 316, a battery 310, and a cell radio 312. The cell radio 312 is coupled to the antenna 220 and is powered by the battery 310 during normal operation. However, the cell radio 312 can also be powered by the activation link circuitry 314 when this circuitry is powered by the wireless power supply 306. The activation link circuitry 314 also powers the SRW radio 316. The activation link circuitry 314 is isolated from the battery 310 so that it does not draw power from the battery 310 when the activation link circuitry 314 is powered by the wireless power supply 306 to provide the eSIM programming, activation, and verification described herein. It is also noted that antenna 220 can also be shared by the cellular radio 312 and the SRW radio 316, if desired, rather than including an additional antenna 318. The activation link circuitry 314 can include a secondary power supply as well as control circuitry, logic circuitry, FSM (finite state machine) circuitry, and/or other electronic circuits configured and/or programmed to perform the activation, programming, and verification processes described herein for the UE device 120.

In operation, the UE device 120 includes a secondary wireless data connection provided by the activation link circuitry 314 and the SRW radio 316. For example, this secondary wireless data connection can be a Bluetooth connection, a NFC (near field communication) connection, and/or another short range wireless connection. The power supply of the activation link circuitry 314 is separated from the power supply of the main functionality of the UE device 120 so as not to consume the UE device's power such as from the battery 310. Instead of a battery, the activation link circuitry 314 is powered temporarily and wirelessly using the wireless power supply 306. This wireless power supply 306 can be, for example, an inductive power source that inductively powers the activation link circuitry 314. For certain embodiments, wireless charging standards can be used for this wireless power supply (e.g., Qi, Powermat, A4WP, and/or other wireless charging standards).

The eSIM activation equipment 102 includes the shielded RF chamber 104 along with the cell radio 108 and the SRW radio 302 for transmission into and reception from inside the RF chamber. The cell radio 108 is configured to receive and transmit signals in accordance with the cellular standard that the UE device 120 has to operate in normal operation (e.g. NB-IoT standard). The SRW radio 302 is configured to receive and transmit signals in accordance with the communication protocol selected for the activation link through the SRW radios 316 and 302 (e.g., Bluetooth, NFC).

Once the UE device 120 is placed inside the RF shielded chamber 104 for the eSIM activation equipment 102 and placed on or adjacent the area reserved for wireless charging, the power supply of the activation link circuitry 314 is powered by the wireless power supply 306 and becomes active. The controller 202 then establishes an activation link to the UE device 120 through the activation link, transfers the SIM profile 110 to the UE device 120, and activates the UE device 120 according to the standardized activation procedure for the eSIM 122. After this activation, the eSIM activation equipment 102, using the cellular communication link, simulates a cellular base station and connects to the UE device 120 as if in normal operation for the UE device 120. The reception functionality of the eSIM activation equipment 102 will receive the cellular signal that the UE device 120 is transmitting, compare it with a pre-defined expected signal, and issue a verdict of that test and/or verification that is shown on the UI 112 and/or communicated through the communication interface 114.

It is again noted that the controller 202 can be implemented as one or more processors and/or other programmable integrated circuits that are programmed to carry out the function described herein. For example, the controller 202 can load and execute instructions stored in one or more non-transitory data storage mediums, for example that are stored in storage device 206, to cause the eSIM activation equipment to perform the functions described herein. Memory 204 can be used by controller 202 to load and execute such instructions. Other variations could also be implemented.

Figure 4:
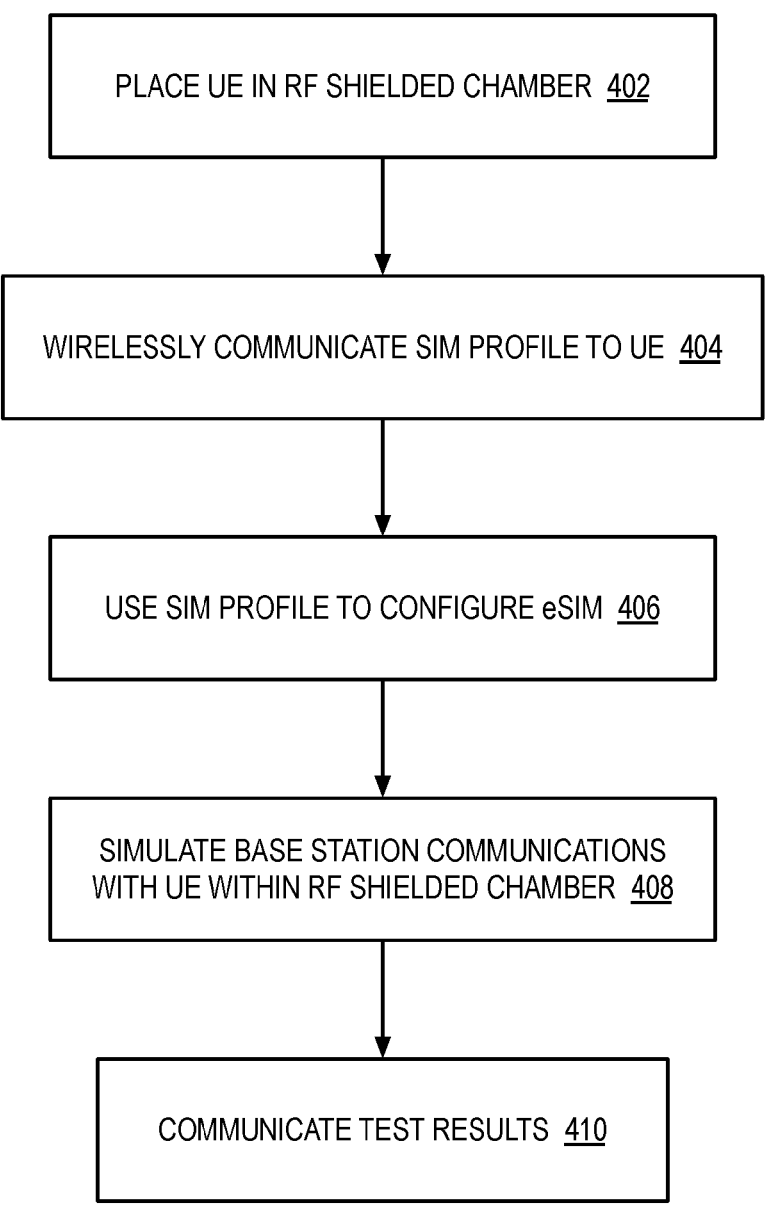
FIG. 4 is a process diagram of an example embodiment that uses a radio frequency (RF) shielded chamber to activate and test a low power UE device having an eSIM.

FIG. 4 is a process diagram of an example embodiment 400 that uses an RF shielded chamber to activate and test a low power UE device having an eSIM. In block 402, a UE device is placed in an RF shielded chamber. In block 404, a SIM profile is wirelessly communicated to the UE device within the RF shielded chamber. In block 406, the SIM profile is used to configure or program the eSIM within the UE device. In block 408, base station communications with the UE device are simulated within the RF shielded chamber, for example, to test and/or verify the operation of the UE device after the eSIM is programmed with the downloaded SIM profile. In block 410, the results of this test or verification are communicated to a user such as through a user interface (e.g., display) or through a communication interface (e.g., network connection) to another computing system.

Figure 5:
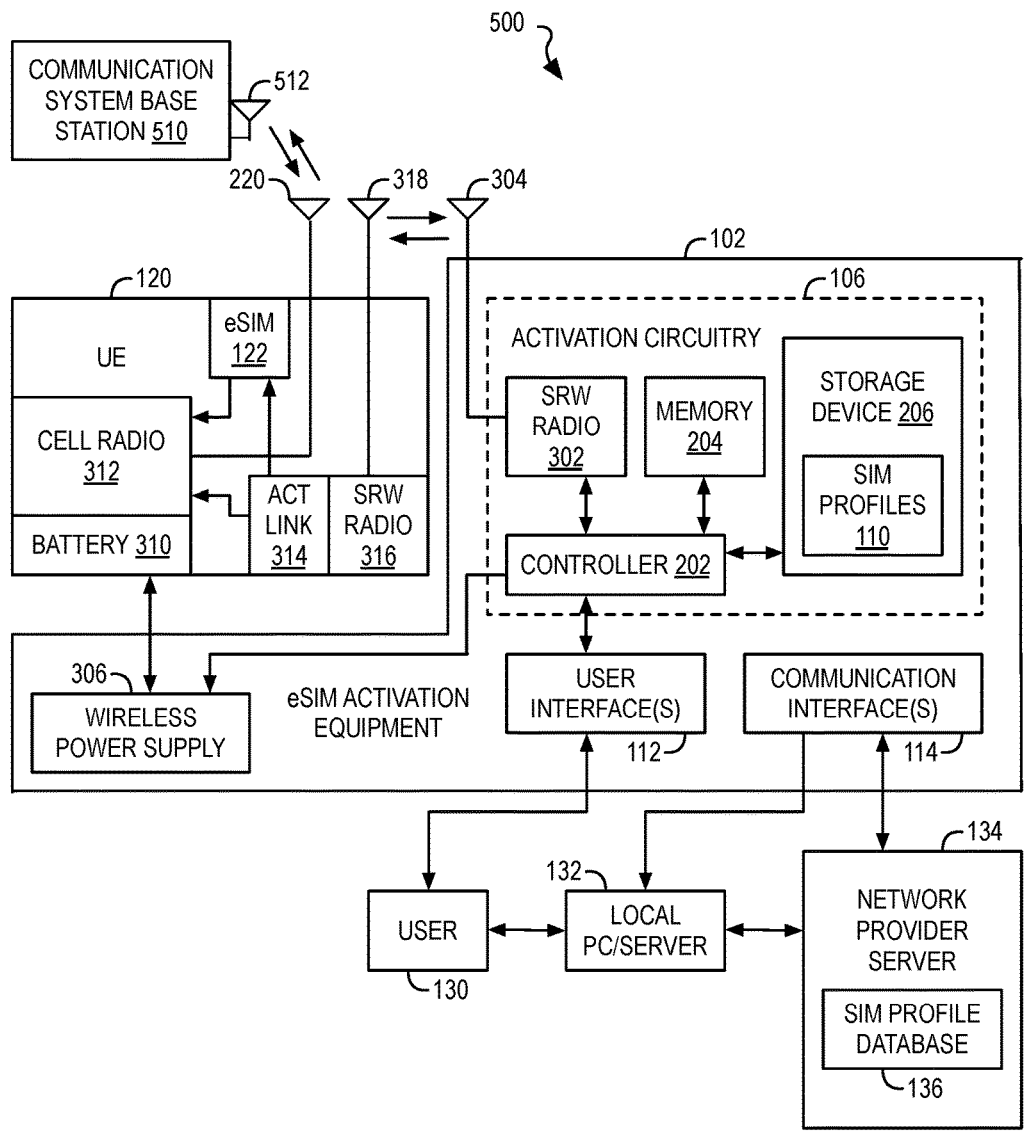
FIG. 5 is a diagram of an example embodiment for eSIM activation equipment that operates as an eSIM activation device and uses an existing cellular communication system along with wireless powering of a separate wireless activation link.

FIG. 5 is a diagram of an example embodiment for eSIM activation equipment 500 that operates as an eSIM activation device. For this example embodiment, the eSIM activation equipment 102 includes activation circuitry 106 that is similar to the embodiment of FIG. 3. However, an RF shielded chamber 104 is not included, and a cell radio 108 and test routines 208 are also not included in this eSIM activation equipment 102. Rather than simulate a base station within an RF shielded chamber 104, the UE device 120 instead communicates with an actual communication system base station 510 through its antenna 512. For this embodiment 500, verification results can still be communicated back to the eSIM activation equipment through the activation link provided by the SRW radios 316 and 302, and a verdict for verification can still be shown on the UI 112 and/or communicated through the communication interface 114.

Similar to FIG. 3, the UE device 120 for embodiment 500 of FIG. 5 includes a secondary wireless data connection provided by the activation link circuitry 314 and the SRW radio 316. For example, this secondary wireless data connection can be a Bluetooth connection, a NFC (near field communication) connection, and/or another short rage wireless connection. The power supply of the activation link circuitry 314 is separated from the power supply of the main functionality of the UE device 120 so to not consume the UE device's power such as the battery 310. Instead of a battery, the activation link circuitry 314 is powered temporarily and wirelessly using the wireless power supply 306. This wireless power supply 306 can be, for example, an inductive power source that inductively powers the activation link circuitry 314. For certain embodiments, wireless charging standards can be used for this wireless power supply (e.g., Qi, Powermat, A4WP, and/or other wireless charging standards).

It is noted that the wireless power supply 306 can be implemented in one embodiment as a pad or platform upon which the UE device 120 can be placed during activation. The pad or platform includes the wireless power supply 306 that provides the wireless charging capability (e.g., in accordance with the standard Qi and/or another wireless charging standard). Once the UE device 120 is placed on or adjacent the area reserved for wireless charging, the power supply of the activation link circuitry 314 is charged and the activation link becomes active, as described above. The eSIM activation equipment 102 including the controller 202 and the user interface ("UI") 112 uses the activation link to connect to the UE device 120. Once the link is established, the eSIM 122 can be programmed with a SIM profile 110 as described herein. For one embodiment, a standard smart phone can be used to provide the activation circuitry 106 and the user interface 112 and can provide the programming, activation, and/or verification of the SIM profile 110 loaded into the eSIM 122 for the UE 120. Such a standard smart phone can also use an application downloaded and run by the smart phone to perform these functions. Other variations can also be implemented.

It is again noted that the controller 202 can be implemented as one or more processors and/or other programmable integrated circuits that are programmed to carry out the function described herein. For example, the controller 202 can load and execute instructions stored in one or more non-transitory data storage mediums, for example that are stored in storage device 206, to cause the eSIM activation equipment to perform the functions described herein. Memory 204 can be used by controller 202 to load and execute such instructions. Other variations could also be implemented.

Figure 6:
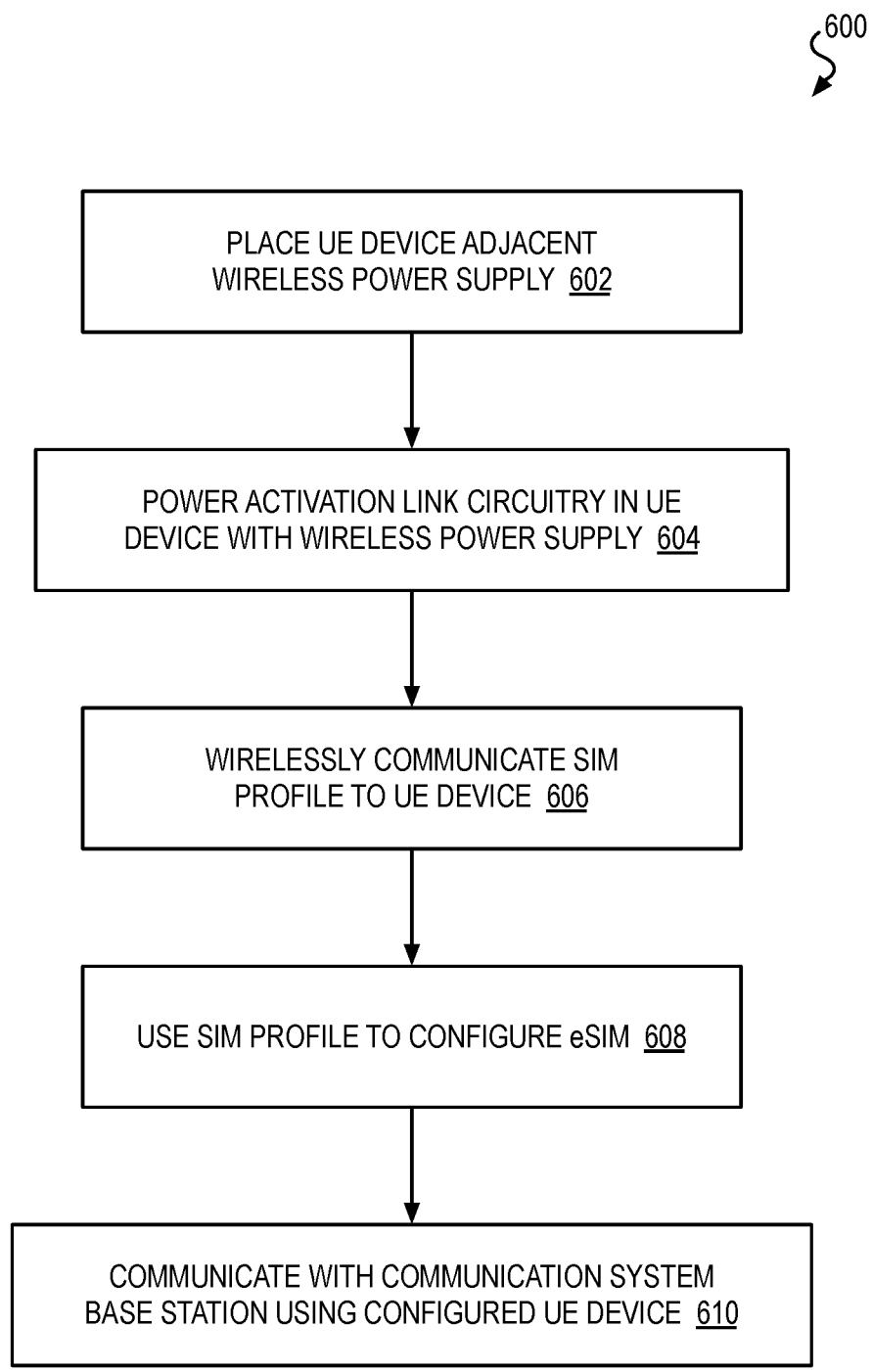
FIG. 6 is a process diagram of an example embodiment where an eSIM for a low power UE device is programmed using an activation link that is powered wirelessly.

FIG. 6 is a process diagram of an example embodiment 600 where an eSIM for a low power UE device is programmed using an activation link that is powered wirelessly. In block 602, a UE device is placed adjacent or on a wireless power supply. In block 604, activation link circuitry within the UE device including related radio circuitry is powered with the wireless power supply. In block 606, a SIM profile is wirelessly communicated to the UE device through the activation link. In an alternate embodiment, the SIM profile is wirelessly communicated from the cell radio of the eSIM activation equipment to the cell radio of the UE similar to the manner described with respect to FIG. 4 and FIGS. 1 and 2, which may alleviate the need for an SRW radio in the UE and in the eSIM activation equipment. In block 608, the eSIM within the UE device is configured or programmed with the SIM profile. In block 610, the configured UE device communicates with a base station of the communication system associated with the SIM profile loaded into the UE device.

Figure 7A:
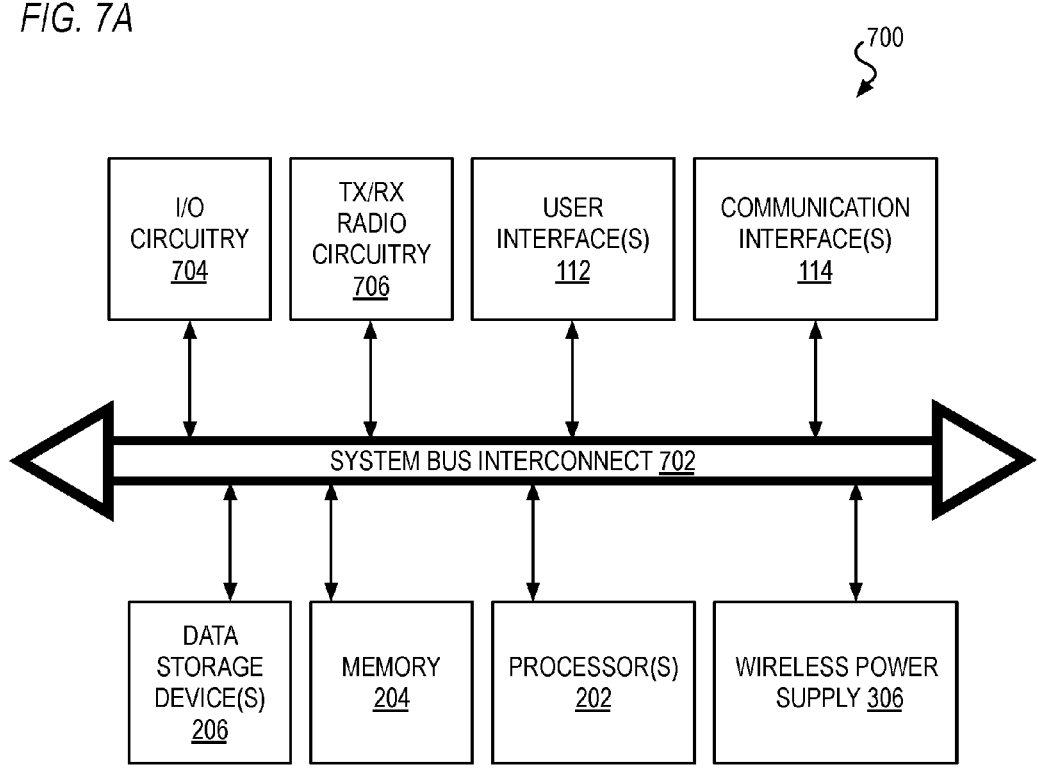
FIGS. 7A-B are diagrams of an example embodiment for electronic components that can be used to implement activation equipment, activation circuitry, UE devices, and/or other processing systems for the disclosed embodiments.

FIG. 7A is a diagram of an example embodiment 700 for electronic components that can be used to implement activation equipment 102, activation circuitry 106, and/or other processing systems for the disclosed embodiments. One or more processors operate as the controller 202 and communicate with other components through system bus interconnect 702. For example, the one or more processors 202 communicate with input/output (I/O) circuitry 704, transmit (TX) and receive (RX) radio circuitry 706, one or more user interfaces (UI) 112, and one or more communication interfaces 114 through the system bus interconnect 702. Additional circuitry can also be included such as power supply circuitry and/or other desired circuitry. For example, in certain embodiments a wireless power supply 306 is included to wirelessly power circuitry within the UE device 120 as described above with respect to FIGS. 3 and 5. The TX/RX radio circuitry 706 can be used to provide, for example, the cell radio 108, the SRW radio 302, and/or other desired radios. The memory 204 is also coupled to the system bus interconnect 702 and can be used by the one or more processors 202 to store instructions, data, and/or other information during operation. One or more data storage device(s) 206 are also connected to the system bus interconnect 702 and can store SIM profiles 110, test routines 208, software or program instructions, and/or other desired data or information for the operation of the processing system. For example, instructions stored in the data storage devices 206 can be loaded within the memory 204 and then executed by the processor(s) 202 to carry out the functions described herein.

Figure 7B:
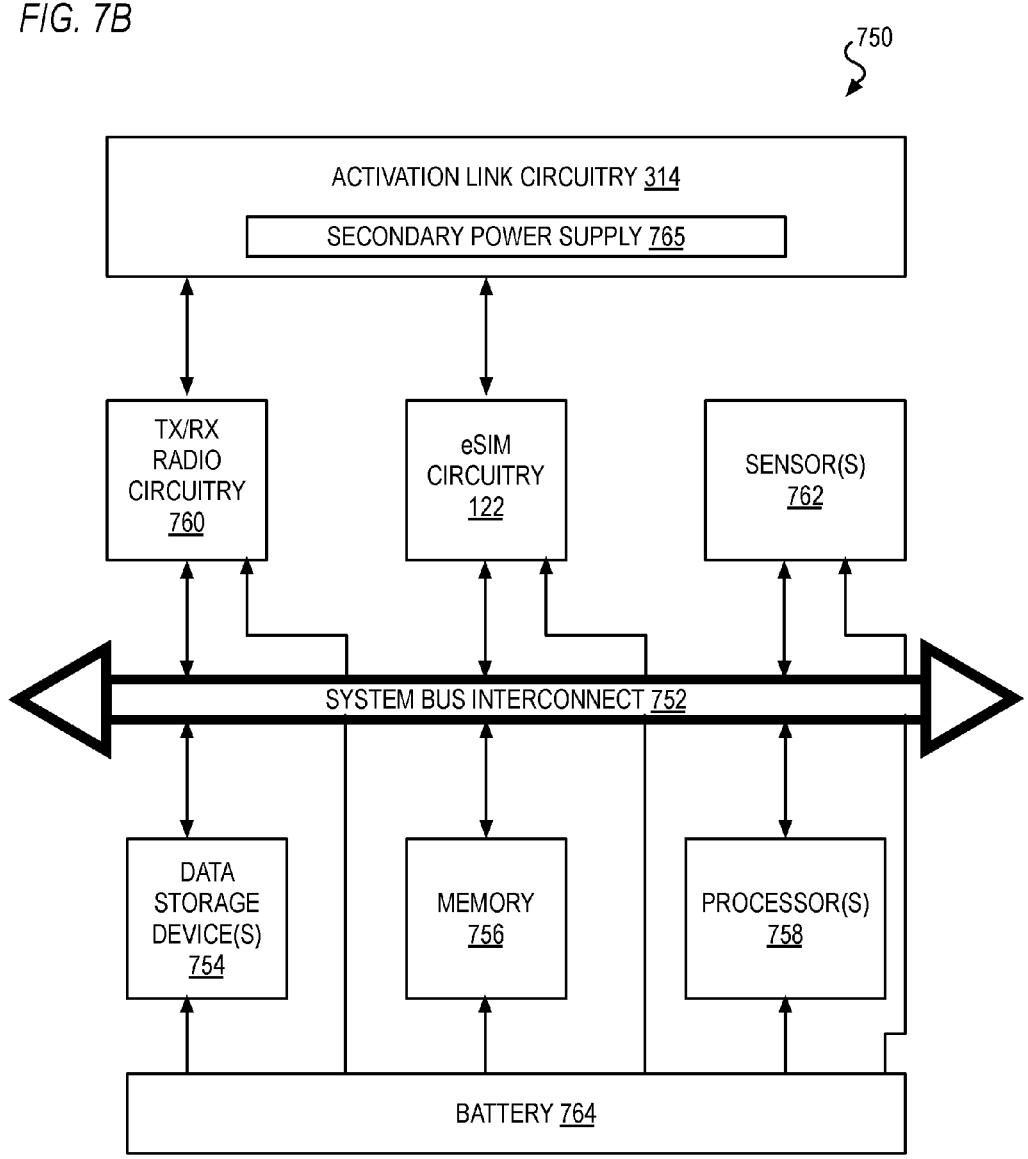

FIG. 7B is a diagram of an example embodiment 750 for electronic components that can be used to implement the UE device 120 for the disclosed embodiments. One or more processors 758 communicate with other components through system bus interconnect 752. For example, the one or more processors 758 communicate through the system bus interconnect 752 with transmit (TX) and receive (RX) radio circuitry 760 and the eSIM circuitry 122, which can be programmable through the system bus interconnect 752. Where the UE device is configured to use sensors, one or more sensors 762 can also be included as part of the UE device and can also be coupled to communicate through the system bus interconnect 752. A battery 764 is coupled to and powers the one or more processors 758 as well as the other components. Additional circuitry can also be included. For example in certain embodiments, activation link circuitry 314 including a secondary power supply 765 is also included, and the secondary power supply 765 can be coupled to the eSIM circuitry 122 and the TX/RX radio circuitry 760 (e.g., to a SRW radio), can be wirelessly powered, and can be used for the activation process as described above with respect to FIGS. 3 and 5. The TX/RX radio circuitry 760 can be used to provide, for example, the cell radio 312, the SRW radios 316, and/or other desired radios. The memory 756 is also coupled to the system bus interconnect 752 and can be used by the one or more processors 758 to store instructions, data, and/or other information during operation. One or more data storage device(s) 754 are also connected to the system bus interconnect 752 and can store software or program instructions and/or other desired data or information for the operation of the processing system. For example, instructions stored in the data storage devices 754 can be loaded within the memory 756 and then executed by the processor(s) 758 to carry out the functions described herein.

It is noted that different and/or additional components from those depicted in FIGS. 7A-B could also be used to implement one or more processing systems for the embodiments described herein while still taking advantage of the eSIM programming, activation, and/or verification described herein. It is further noted that the system bus interconnect 702/752 can be implemented as multiple interconnection buses with our without additional intervening circuitry such as routing or switching circuitry. Further, the processor(s) 202/758 can be implemented using one or more processing devices including controllers, microcontrollers, microprocessors, hardware accelerators, configurable logic devices (e.g., field programmable gate arrays), and/or other processing devices or programmable integrated circuits that are programmed to carry out the function described herein. Further, the one or more processing devices can execute instructions stored in a non-transitory tangible computer-readable medium to perform the functions described herein. In addition, data storage device(s) 206/754 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory 204/756 can be any data storage medium configured to maintain data storage when powered. Other variations could also be implemented. Further, embodiments are contemplated in which the RF shielded chamber is large enclosed space or cavity that shields RF signals from entering or exiting such as an underground cavern or RF shielded factory building that also encloses the activation circuitry of the eSIM activation equipment. An advantage of such an embodiment may be that it facilitates many low power IoT cellular devices to be programmed at a time.

It is also noted that the functions described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/ or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the reciprocity compensation techniques described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. An apparatus, comprising:
a cellular frequency radio, either coupled to or configured to be coupled to an antenna, wherein the antenna is disposed within a radio frequency (RF) shielded chamber that is configured to receive a cellular device;
wherein the cellular device comprises an embedded subscriber identification module (eSIM); and
a processor programmed to, while the cellular device is in the shielded chamber, control the radio to use the antenna to:
transmit a subscriber identification module (SIM) profile to the cellular device, wherein the SIM profile includes a subscriber phone number and authentication information; and
subsequently use the RF-shielded chamber to simulate a cellular base station of a cellular communication system associated with the SIM profile to communicate with the cellular device via the cellular frequency radio to perform an authentication procedure that requires the cellular device to use the eSIM loaded with the SIM profile to test operation of the cellular device to verify that the cellular device has successfully loaded the SIM profile into the eSIM in order to subsequently communicate with the cellular communication system associated with the SIM profile after being removed from the RF-shielded chamber.

2. The apparatus of claim 1, further comprising:
a user interface configured to provide to a user results of the test.

3. The apparatus of claim 1,
wherein the apparatus is configured to cause the SIM profile to be loaded into the eSIM for the cellular device that is without a user interface able to provide to a user results of the test.

4. The apparatus of claim 1, further comprising:
a communication interface configured to obtain the SIM profile from a network provider server.

5. The apparatus of claim 1, further comprising:
a user interface usable by a user to input identification information used to obtain the SIM profile; and
wherein the apparatus is configured to cause the SIM profile to be loaded into the eSIM for the cellular device that is without a user interface capable of receiving the identification information.

6. A method for loading a subscriber identification module (SIM) profile into a cellular device having an embedded subscriber identification module (eSIM), the method comprising:
placing the cellular device into a radio frequency shielded chamber;
transferring the SIM profile to the cellular device wirelessly using signals in a cellular frequency range while the cellular device is in the shielded chamber, wherein the SIM profile includes a subscriber phone number and authentication information;
loading the transferred SIM profile into the eSIM of the cellular device; and subsequently using the radio frequency shielded chamber to simulate a cellular base station of a cellular communication system associated with the SIM profile to communicate with the cellular device via a cellular frequency radio to perform an authentication procedure that requires the cellular device to use the eSIM loaded with the SIM profile to test operation of the cellular device to verify that the cellular device has successfully loaded the SIM profile into the eSIM in order to subsequently communicate with the cellular communication system associated with the SIM profile after being removed from the radio frequency shielded chamber.

7. The method of claim 6, further comprising:
simulating a cellular network base station to communicate with the cellular device using signals in the cellular frequency range to test operation of the cellular device while the cellular device uses the SIM profile loaded into the eSIM; and
wherein said simulating is performed while the cellular device is in the shielded chamber and after said transferring the SIM profile to the cellular device.

8. The method of claim 7, further comprising:
providing to a user results of the test.

9. The method of claim 8,
wherein said providing to the user the results is performed by a user interface that is separate from the cellular device having the eSIM.

10. The method of claim 6,
wherein the cellular device is absent a SIM profile prior to said transferring the SIM profile to the cellular device wirelessly using signals in the cellular frequency range.

11. The method of claim 6,
wherein said transferring the SIM profile to the cellular device wirelessly using signals in the cellular frequency range is performed by a simulated cellular network base station having one or more antennas which the radio frequency shielded chamber shields from wirelessly communicating with any cellular networks being operated by commercial cellular network operators.

12. The method of claim 6,
wherein said transferring the SIM profile to the cellular device wirelessly comprises transferring the SIM profile using a control channel of a cellular communication protocol.

13. A cellular device, comprising:
an embedded subscriber identification module (eSIM) without a subscriber identification module (SIM) profile;
a cellular frequency radio;
a processor configured to:
control the radio to wirelessly receive a SIM profile while the eSIM is still without a SIM profile;
load the received SIM profile into the eSIM; and
control the radio to wirelessly communicate with a cellular network using the SIM profile loaded into the eSIM; and
wherein the cellular device is without a user interface capable of outputting to a user results of a test of operation of the cellular device using the SIM profile loaded into the eSIM, and wherein the cellular device is configured to communicate with an apparatus that outputs to the user the results of the test of operation of the cellular device using the SIM profile loaded into the eSIM.

14. The cellular device of claim 13,
wherein the cellular device is without a user interface capable of receiving input that is identification information usable to obtain the SIM profile from a cellular network provider server, and wherein the cellular device is configured to receive from the apparatus the input that is identification information usable to obtain the SIM profile from the cellular network provider server.

15. A method for loading a subscriber identification module (SIM) profile into a cellular device having an embedded subscriber identification module (eSIM), the method comprising:
placing the cellular device into a radio frequency shielded chamber;
transferring the SIM profile to the cellular device wirelessly using signals in a non-cellular, short range wireless (SRW) frequency range, wherein the SIM profile includes a subscriber phone number and authentication information;
loading the transferred SIM profile into the eSIM of the cellular device;
using the radio frequency shielded chamber to simulate a cellular network base station of a cellular communication system associated with the SIM profile to communicate with the cellular device using signals in a cellular frequency range to test operation of the cellular device while the cellular device uses the SIM profile loaded into the eSIM; and
wherein said simulating is performed while the cellular device is in the shielded chamber and after said transferring the SIM profile to the cellular device.

16. The method of claim 15, further comprising:
providing to a user results of the test; and
wherein said providing to the user the results is performed by a user interface that is not part of the cellular device having the eSIM.

* * * * *